(12) United States Patent
Lo et al.

(10) Patent No.: US 11,388,504 B1
(45) Date of Patent: Jul. 12, 2022

(54) HEADPHONE WITH PRESSURE SENSOR

(71) Applicant: Cheng Uei Precision Industry Co., Ltd., New Taipei (TW)

(72) Inventors: Sheng Chieh Lo, New Taipei (TW); Peng Yuan Lee, New Taipei (TW); Tzu Yi Wang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 17/313,109

(22) Filed: May 6, 2021

(51) Int. Cl.
*H04R 1/10* (2006.01)
*G01L 19/14* (2006.01)

(52) U.S. Cl.
CPC ............ *H04R 1/1041* (2013.01); *G01L 19/14* (2013.01); *H04R 1/105* (2013.01); *H04R 1/1008* (2013.01); *H04R 1/1075* (2013.01)

(58) Field of Classification Search
CPC . H04R 1/00; H04R 1/02; H04R 1/026; H04R 1/10; H04R 1/1008; H04R 1/1016; H04R 1/1041; H04R 1/1058; H04R 1/1066; H04R 1/1075; H04R 1/1091; H04R 1/105; H04R 5/033; H04R 5/0335; G01L 19/14
See application file for complete search history.

(56) References Cited

U.S. PATENT DOCUMENTS

| 5,675,658 A | * | 10/1997 | Brittain | H04R 3/002 381/186 |
| 10,057,674 B1 | * | 8/2018 | Tseng | H04R 1/1041 |
| 2018/0310893 A1 | * | 11/2018 | Everman | A61B 5/746 |

* cited by examiner

*Primary Examiner* — Thang V Tran
(74) *Attorney, Agent, or Firm* — Lin & Associates Intellectual Property, Inc.

(57) ABSTRACT

A head band; and a pair of earmuffs being respectively mounted on two ends of the head band, each of the earmuffs has a speaker and a cushion. The cushion has an annular elastic portion protruded from a peripheral of the cushion and a chamber is surrounded by the annular elastic portion. The speaker has a back housing. A circuit board mounted to the back housing. A connector mounted on the circuit board. A speaker unit mounted to the back housing. A front housing covers the speaker unit and is assembled with the back housing. An opening penetrated through the front housing. A pressure sensor is disposing in the opening. A flexible circuit board connected between the pressure sensor and the connector of the circuit board. The cushion attached to the front housing. The pressure sensor is located in the chamber.

4 Claims, 4 Drawing Sheets

HEADPHONE WITH PRESSURE SENSOR

BACKGROUND OF THE INVENTION

1. Field of the Invention

The present invention generally relates to a headphone, and more particularly to a headphone with a pressure sensor for detecting air pressure.

2. The Related Art

When the user puts on a conventional headphone, the user needs to push a button manually for activating headphone function, such as playing music, etc.

However, when the user is exercising or performing activities, who is unable to control the button manually for activating headphone function, the conventional headphone is inconvenient. If the headphone has a sensing function that can judge whether the headphone is put on the head of the user or not, the headphone can automatically activate the headphone function according to the result of the sensing function. When the user wears the headphone with the sensing function, the headphone can activate corresponding functions automatically. It is convenient because the sensing function saves the user's operation time.

Thus, it is necessary to provide a headphone with a sensing function which activates the corresponding function by judging whether the headphone is put on the head of the user or not, in order to facilitate convenient operation.

SUMMARY OF THE INVENTION

An object of the present invention is to provide A head band; and a pair of earmuffs being respectively mounted on two ends of the head band, each of the earmuffs has a speaker and a cushion. The cushion has an annular elastic portion protruded from a peripheral of the cushion and a chamber is surrounded by the annular elastic portion. The speaker has a back housing. A circuit board mounted to the back housing. A connector mounted on the circuit board. A speaker unit mounted to the back housing. A front housing covers the speaker unit and is assembled with the back housing. An opening penetrated through the front housing. A pressure sensor is disposing in the opening. A flexible circuit board connected between the pressure sensor and the connector of the circuit board. The cushion attached to the front housing. The pressure sensor is located in the chamber.

As described above, the headphone with pressure sensing function sense the change of air pressure in the chamber through the pressure sensor to determine that the user is in the state of wearing the headphone with pressure sensing function.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
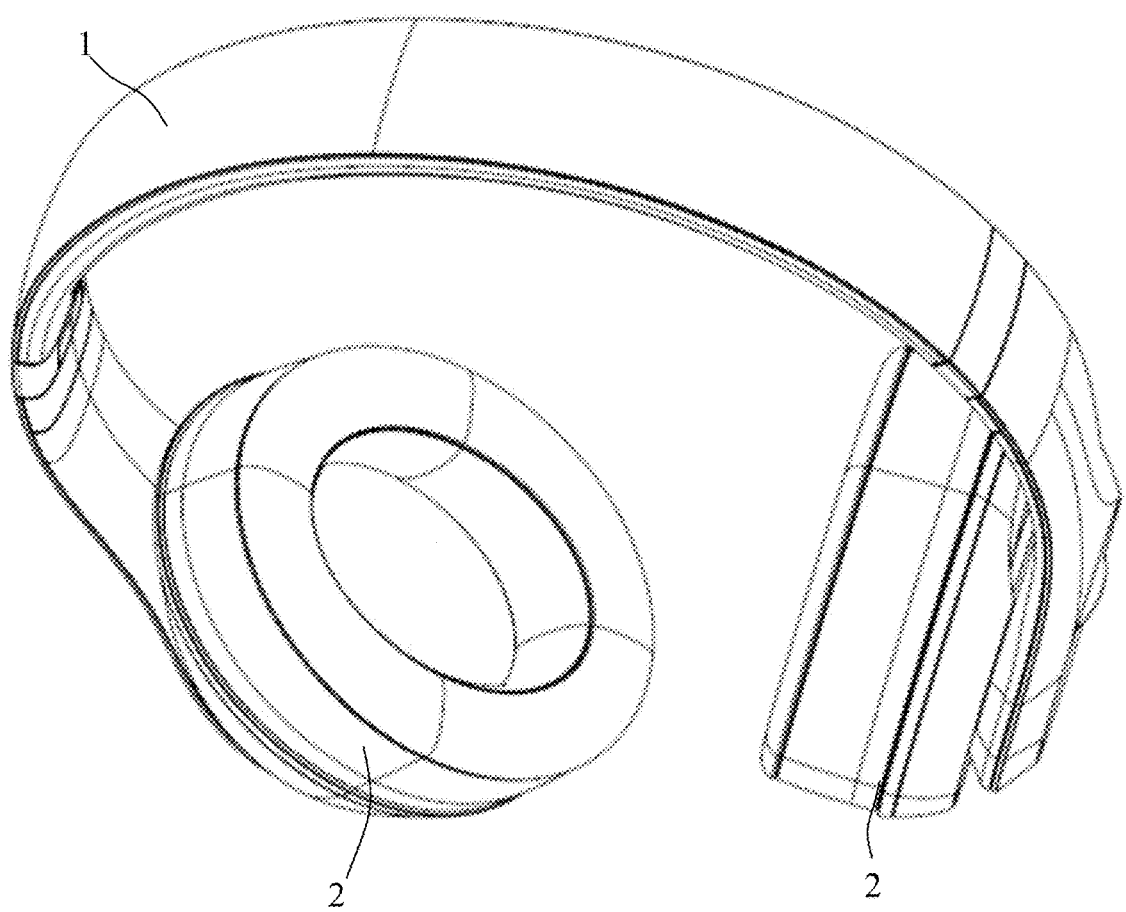
FIG. 1 is a perspective view of a headphone in accordance with the present invention.
Figure 2:
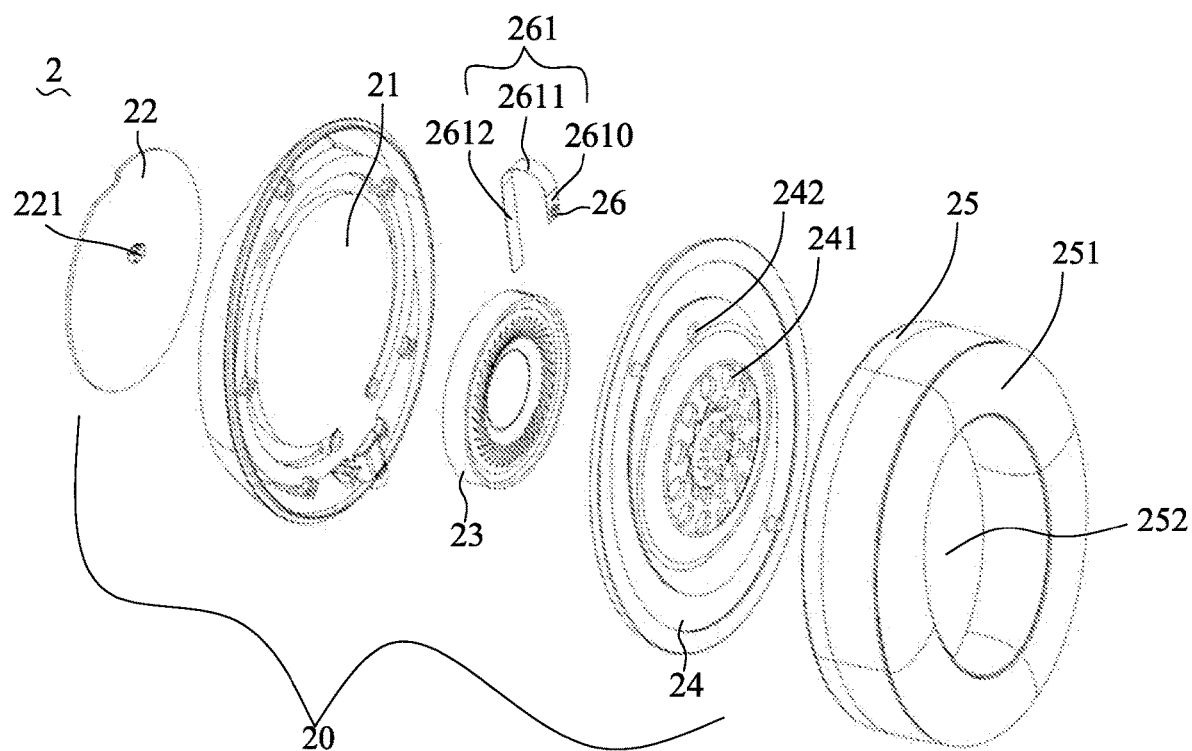
FIG. 2 is an exploded perspective view of the headphone in accordance with the present invention.

With reference to FIG. 1 and FIG. 2, a headphone 100 includes a head band 1 and a pair of earmuffs 2. The earmuffs 2 are respectively mounted on two ends of the head band 1.

Each of the earmuffs 2 includes a speaker 20 and a cushion 25. The speaker 20 includes a back housing 21, a circuit board 22, a speaker unit 23, and a front housing 24.

The circuit board 22 is mounted to the back housing 21, and the circuit board 22 has a connector 221.

The speaker unit 23 is mounted to the back housing 21. The speaker unit 23 converts electrical signal into sound.

The front housing 24 covers the speaker unit 23. The front housing 24 has a plurality of sound holes 241. The sound holes 241 are positioned to correspond to the speaker unit 23. The speaker 23 radiates the sound, the sound pass through the sound holes 241 and enter into the user's ear. The front housing 24 has an opening 242.

The cushion 25 is mounted to the front cover 24 and covers the sound holes 241. The cushion 25 protrudes outward to form an annular elastic portion 251. The annular elastic portion 251 is protrudes from a peripheral of the cushion 25. The annular elastic portion 251 is compressed and deformed by an external pressure, and is returned to the original shape after the external pressure is removed. The cushion has a chamber 252 surrounded by the annular elastic portion 251.

Figure 3:
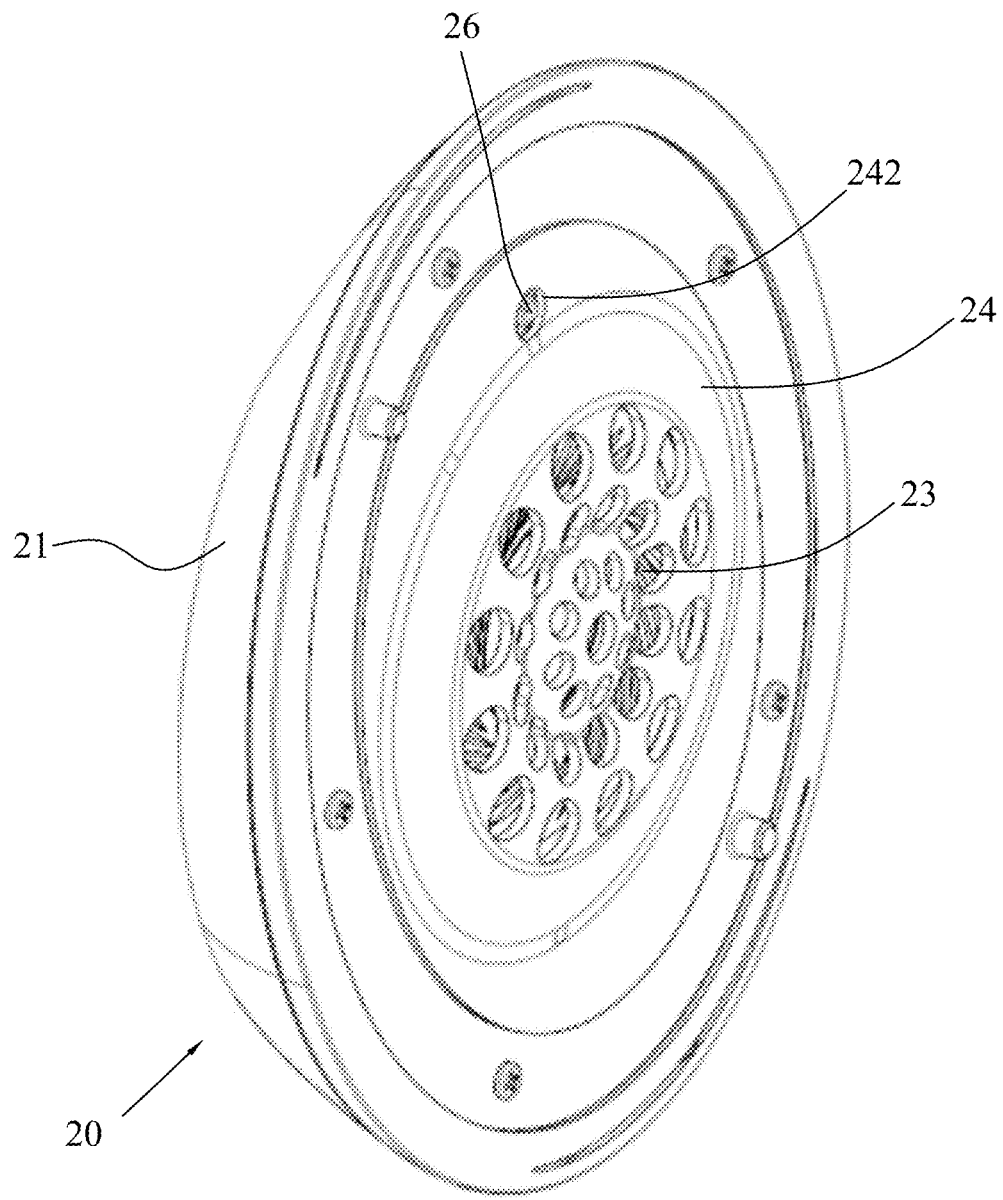
FIG. 3 is a perspective view showing a partial assembly of the headphone in accordance with the present invention.

With reference to FIG. 2 and FIG. 3, the headphone 100 has at least one pressure sensor 26 disposed in the speaker 20, the pressure sensor 26 is positioned in the opening 242 and is located in the chamber 252. The pressure sensor 26 detects air pressure in the chamber 252. The pressure sensor 26 is connected with a flexible circuit board 261, and the flexible circuit board 261 is passed through the back housing 21 and is connected with the connector 221 of the circuit board 22. The flexible circuit board 261 is formed as an inverted J-shape. The flexible circuit 261 has a short piece 2610, a bending piece 2611 and a long piece 2612. The bending piece 2611 is connected between the short piece 2610 and the long piece 2612. The short piece 2610 is parallel with the long piece 2612. The pressure sensor 26 is arranged on the short piece 2610. The bending piece 2611 is strode across the speaker unit 23. The long piece 2612 is passed through the back housing 21 and a tip end of the long piece 2612 is connected to the connector 221 of the circuit board 22.

When the pressure sensor 26 detects variations in air pressure of the chamber 252, the pressure sensor 26 sends a signal to the circuit board 22 through the flexible circuit board 261 and the connector 221. When the circuit board 22 receives the signal from the pressure sensor 26, the circuit board 22 judges whether the headphone 100 is put on the head of the user or not.

Figure 4:
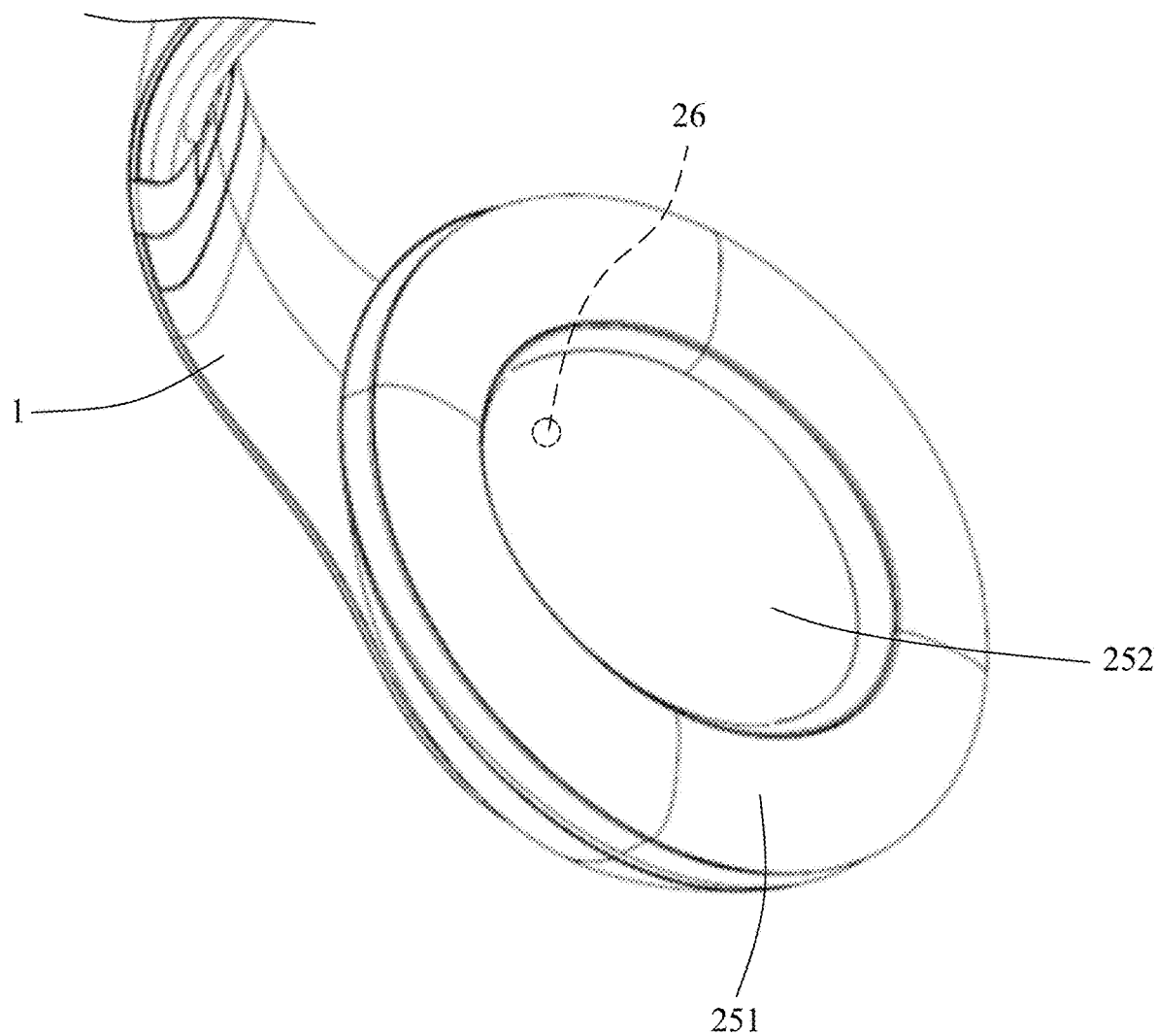
FIG. 4 is a perspective view of a compressed cushion of the headphone in accordance with the present invention.

With reference to FIG. 1 and FIG. 4, when the user takes off the headphone 100, the chambers 252 of the cushion 25 is in an open state. When the user puts on the headphone 100, the cushions 25 cover the user's ears the to make the open state of the chambers 252 into a semi-sealed state of the chambers 252. The annular elastic portion 251 of the cushions 25 are compressed by user's ears and are deformed. The space of the chambers 252 of the cushions 25 is compressed via the deformed annular elastic portion 251. When the space of the chambers 252 of the cushions 25 is compressed, the air in the chambers 252 of the cushions 25 is compressed too, that causes the air pressure in the chambers 252 of the cushions increases rapidly, thereby giving a momentary pressure to the pressure sensor 26. When the pressure sensor 26 detects an increasing pressure, the circuit board 22 judges that the headphone 100 is put on the head, and the circuit board 22 performs the corresponding functions, such as playing music.

When the user takes off the headphone 100, the ears leave the cushions 25, the annular elastic portions 251 and the chambers 252 of the cushions 25 return to the initial state. The air pressure of the chambers 252 of the cushions 25 decreases and returns to the initial state. When the pressure sensor 26 detects an decreasing pressure, the circuit board 22 judges that the user takes off the headphone 100, and the circuit board 22 performs the corresponding functions, such as stop playing music.

As described above, the headphone with pressure sensing function 100 sense the change of air pressure in the chamber 252 through the pressure sensor 26 to determine that the user is in the state of wearing the headphone with pressure sensing function 100.

What is claimed is:

1. A headphone, comprising:
   a head band; and
   a pair of earmuffs being respectively mounted on two ends of the head band, each of the earmuffs having a speaker and a cushion, the cushion having an annular elastic portion protruded from a peripheral of the cushion and a chamber being surrounded by the annular elastic portion, the speaker having a back housing, a circuit board mounted to the back housing, a connector mounted on the circuit board, a speaker unit mounted to the back housing, a front housing covering the speaker unit and being assembled with the back housing, an opening penetrated through the front housing, a pressure sensor being disposing in the opening, a flexible circuit board connected between the pressure sensor and the connector of the circuit board, the cushion attached to the front housing, the pressure sensor being located in the chamber.

2. The headphone as claimed in claim 1, wherein the speaker unit are positioned between the back housing and the front housing, the front housing has a plurality of sound holes, the sound holes are positioned to correspond to the speaker unit.

3. The headphone as claimed in claim 2, wherein the flexible circuit board has a short piece, a bending piece and a long piece, the bending piece is connected between the short piece and the long piece, the pressure sensor is arranged on the short piece, the bending piece is strode across the speaker unit, the long piece is passed through the back housing and a tip end of the long piece is connected to the connector of the circuit board.

4. The headphone as claimed in claim 3, wherein the short piece is parallel with the long piece, the flexible circuit board is formed as an inverted J-shape.

* * * * *